United States Patent [19]

Schulte et al.

[11] Patent Number: 5,319,367

[45] Date of Patent: Jun. 7, 1994

[54] PROCESS AND APPARATUS FOR THE AVOIDANCE OF AIRPLANE COLLISIONS

[75] Inventors: Peter Schulte, Arnsberg; Siegfried Schmees, Geseke, both of Fed. Rep. of Germany

[73] Assignee: Hella Kg Hueck & Co., Lippstadt, Fed. Rep. of Germany

[21] Appl. No.: 855,699

[22] PCT Filed: Sep. 12, 1991

[86] PCT No.: PCT/EP91/01733

§ 371 Date: May 6, 1992

§ 102(e) Date: May 6, 1992

[87] PCT Pub. No.: WO92/05529

PCT Pub. Date: Apr. 2, 1992

[30] Foreign Application Priority Data

Sep. 14, 1990 [DE] Fed. Rep. of Germany ....... 4029204

[51] Int. Cl.[5] .............................................. G08G 5/04
[52] U.S. Cl. ................... 340/961; 340/963; 362/62
[58] Field of Search ............... 340/961, 945, 981, 982, 340/471, 472, 331, 963; 362/62; 315/241 S; 116/22 A; 244/1 R; 43/1; 364/461

[56] References Cited

U.S. PATENT DOCUMENTS

| 2,876,388 | 3/1959 | Bader et al. . |
| 3,203,305 | 8/1965 | Fairbanks ............................ 340/945 |
| 3,903,501 | 9/1975 | Greenlee et al. . |
| 4,011,541 | 3/1977 | Fabry et al. . |
| 4,227,174 | 10/1980 | Belcher et al. ...................... 340/471 |
| 4,346,430 | 8/1982 | Holland ................................. 362/62 |
| 4,736,907 | 4/1988 | Steffen ................................ 340/981 |

FOREIGN PATENT DOCUMENTS

| 0236267 | 9/1987 | European Pat. Off. ............ 340/981 |
| 3409497 | 9/1985 | Fed. Rep. of Germany . |
| 2227993 | 11/1974 | France . |
| 2214367 | 8/1989 | United Kingdom . |
| 9205530 | 4/1992 | World Int. Prop. O. .......... 340/961 |

*Primary Examiner*—Brent Swarthout
*Attorney, Agent, or Firm*—Griffin Butler Whisenhunt & Kurtossy

[57] ABSTRACT

In a process and an apparatus for the avoidance of airplane collisions in which at least one light source of a light flash warning apparatus on an airplane generates light flashes at periodic intervals, light flashes with a constant frequency are emitted from a first light source and light flashes with a variable frequency are emitted from a second light source, thereby increasing the warning effectiveness, localizing capability and, thereby, safety during operation of the airplane.

9 Claims, 1 Drawing Sheet

PROCESS AND APPARATUS FOR THE AVOIDANCE OF AIRPLANE COLLISIONS

BACKGROUND OF THE INVENTION

The invention relates generally to a process for the avoidance of airplane collisions wherein light flashes are generated in periodic intervals from a light flash warning apparatus on an airplane comprising at least one light source, and to an apparatus for the avoidance of airplane collisions including the light flash warning apparatus on the airplane comprising the at least one light source and generating the light flashes in periodic intervals.

With an increase of air traffic in all areas near-collision incidents are increasing. In order to warn off other airplane approaches, light flash warning apparatus on airplanes are used, comprising at least one light source, which generate light flashes in periodic intervals. The light flashes increase visibility of approaching airplanes whereby early course corrections can be initiated in order to avoid airplane collisions.

In apparatus and processes for the avoidance of airplane collisions of the prior art in which light flash warning apparatus are used, it has proven to be disadvantageous for light flashes to be generated only in periodic intervals, that is with a constant frequency, whereby these light flash warning apparatus draw only limited attention from other pilots, thereby decreasing warning effectiveness of such light flash warning apparatus and leading to operation of an airplane with insufficient safety, particularly in congested areas.

An apparatus of this kind is known from U.S. Pat. No. 3,903,501 wherein light flashes are generated in periodic intervals. To increase warning effectiveness a light source generates light flashes which are dephased from other light flashes by a fixed value. Also, in this case, it proves to be disadvantageous that a habit-forming effect is achieved.

It is an object of the invention to provide a process and an apparatus for the avoidance of airplane collisions wherein the warning effectiveness, the ability to localize, and, thereby, the safety are increased during operation of the airplane.

SUMMARY

The object of the invention is achieved by a process whereby light flashes with a constant frequency are emitted from a first light source and light flashes with a variable frequency are emitted from a second light source.

DESCRIPTION OF THE PREFERRED EMBODIMENT

Figure 1:
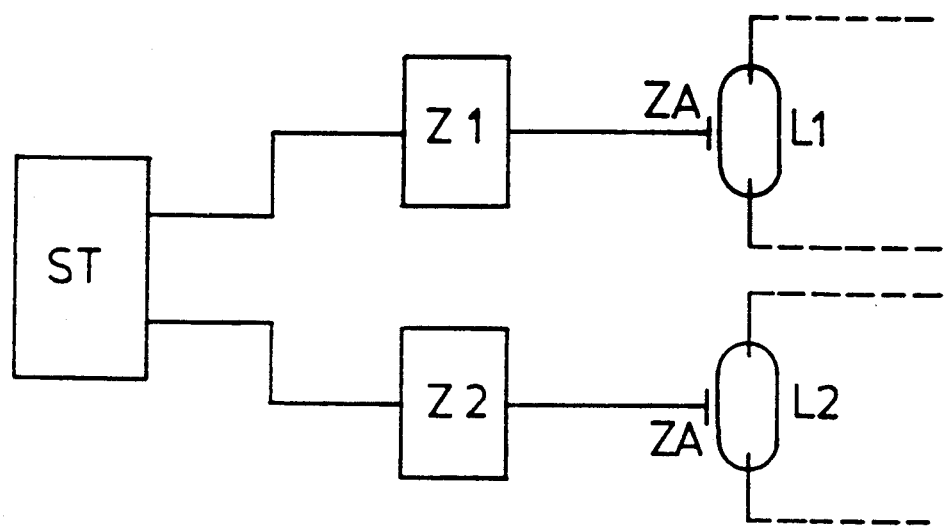
FIG. 1 is a simplified, block circuit diagram of an apparatus according to this invention.

FIG. 1 shows one embodiment, in the form of a block circuit diagram, of apparatus for the avoidance of airplane collisions comprising a control apparatus ST. A voltage supply of the control apparatus ST is not shown. The control apparatus ST comprises in this embodiment two outputs, a first output being linked electrically-conductively to a first ignition device Z1 and a second output being linked electrically-conductively to a second ignition device Z2. The first ignition device Z1 is linked to an ignition anode ZA of a first light source L1. The second ignition device Z2 is linked to an ignition anode ZA of a second light source L2. The light sources L1, L2 in this embodiment are discharge lamps and generate light flashes due to signals from the first ignition device Z1 and the second ignition device Z2. The power supplies for the light sources L1, L2 are not shown. Each light source L1, L2 may have a separate power supply. Both light sources L1, L2 can also be hooked up to only one power supply.

In another embodiment an increase of system safety may be achieved by arranging the first ignition device Z1 and the second ignition device Z2 with separate control apparatus ST which may be linked to one another for synchronization of the light flashes to be generated.

The at least one control apparatus comprises a pulse generator which determines a constant frequency for generation of light flashes. These light flashes with constant frequency may be emitted, for example, by the first light source L1. Further, the at least one control apparatus ST comprises a function generator or a random generator or a program memory which determines a variable frequency for the generation of light flashes at different intervals. These light flashes in this embodiment are emitted by the second light source L2.

In another embodiment, further light sources may be controlled by the at least one control apparatus ST. It is also possible to derive all control signals from only one function and/or impulse generator. It has proven to be particularly uncomplicated, cost-effective and efficient for the function generator to be a sine generator thereby achieving a particularly high warning effectiveness with low construction cost.

The entire apparatus, not shown completely, may be linked via a suitable interface with an on-board radar system which recognizes flight objects in a predetermined space around the airplane and automatically activates the apparatus in case of danger of collision and automatically deactivates it when no other flight object is present in the predetermined space around the airplane.

In addition, the apparatus may be switched on manually or automatically during take-off or landing phases thereby preventing bird impacts.

Figure 2:
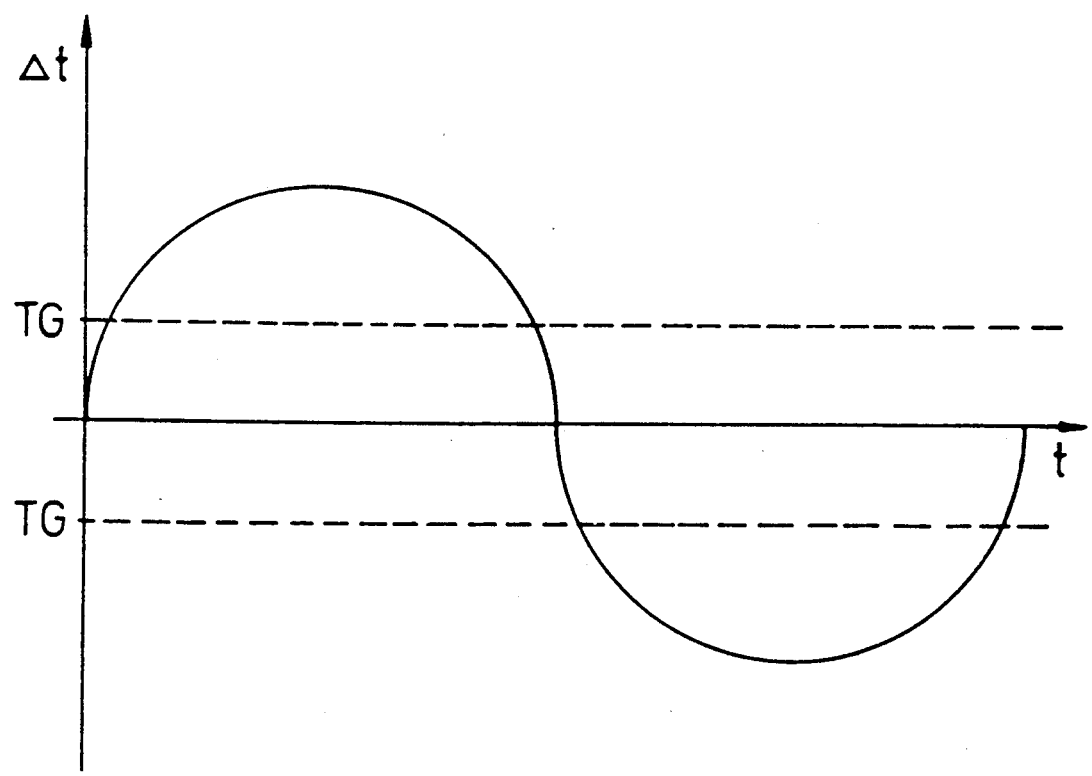
FIG. 2 is a diagram depicting, as an example, a phase difference of two flashes as a function of time.

FIG. 2 shows a diagram depicting a phase displacement (Δt) as time dependent from time (t). While the first light source L1 emits, in this embodiment, light flashes with constant frequency, the second light source L2 emits light flashes with variable frequency controlled by the at least one control apparatus ST. A periodic function was chosen which is sine-like in this embodiment. Basically, all periodic or aperiodic functions are also suitable to increase the warning effectiveness of the apparatus. A particularly simple realization is achieved by applying a sinusoidal function. As depicted in the diagram, the frequency of the periodic function leads or lags that of the constant frequency. In this regard, in order to avoid habit-forming effects, it is beneficial for a slope of the function to be as variable as possible in order to increase the warning effectiveness. In addition, it is important that the time interval of two sequenced flashes be outside of a time limit area TG which determines the limit of resolution for two sequenced light flashes for human perception capability. The fewer the light flashes emitted at intervals lying in a time limit area TG, the higher the warning effectiveness, the ability to localize and, thereby, the safety during the operation of airplanes. Therefore, it is beneficial to use only such values of the function which are outside of the time area TG when applying a random function or any programmed function.

An increase in the localizing ability and warning effectiveness can also be achieved when the first light source L1 as well as the second light source L2 emit light flashes with variable frequencies, the frequencies being determined by periodic or aperiodic functions and where the phase difference, in this case the time ($\Delta t$), is maximal between the function curves.

These thus generated light flash sequences are particularly suitable also for the prevention of bird impacts during take-off and landing phases of airplanes.

It is beneficial to generate light flashes with a constant frequency from a first light source and light flashes with a variable frequency from a second light source in that two light flashes are emitted in an uncomplicated and cost-effective manner whose time intervals are continually varied whereby a habit-forming effect is avoided, and the attention of other pilots, and thereby the warning effectiveness, is increased, thus contributing to a substantial increase in safety during operation of airplanes. Further, it is beneficial that, because of these emitted light flashes with different, varying, time spacings, the ability to locate an approaching flying object is improved, whereby necessary course corrections can be executed in a simpler, faster way and in a correct direction.

The same benefit is derived by having at least one control apparatus linked, via a first ignition device, to a first light source emitting light flashes with a constant frequency and at least one control apparatus linked, via a second ignition device, to a second light source emitting light flashes with a variable frequency.

It is beneficial that the variable frequency is determined by a periodic or aperiodic function in a phase preceding or lagging behind the constant frequency periodically or aperiodically, because in this uncomplicated and cost-effective way it is ensured that a time interval of a flash sequence is continually varied so as to avoid habit-forming effects and to increase warning effectiveness of this process for the operation of a light flash warning apparatus thereby increasing safety during operation of airplanes.

The use of an aperiodic function provides the benefit of excluding a habit-forming effect in any case.

It is particularly beneficial for the function to be a sine-like function or a sinusoidal function, because with functions of this kind intervals of light flashes are very large during periodic function curves and, in addition, the function includes widely varying inclines, thereby further increasing warning effectiveness.

Defining the function in such a manner that a limit of resolution for two flashing light sources flashing at different times is exceeded as much as possible and so that the function has a slope as widely variable as possible results in the benefit that, in addition to allowing particularly good localization of approaching airplanes, warning effectiveness is increased since two light flashes with small time lags are not recognized any more as two light flashes, but can only be perceived as one light flash. Therefore, if the light flashes are in a time interval above this limit of resolution, which is approximately larger or equal +/− 40 milliseconds, and if the function, in addition, has an incline as widely variable as possible, a very high ability to localize an approaching airplane is achieved with very high warning effectiveness.

This effect can be further increased if the function generates only flashes outside of the limit of resolution.

It is beneficial if the function is a random function, because in this manner it is ensured that a habit-forming effect at the sight of light flashes is not achieved.

Emitting light flashes from a first light source also with a variable frequency, defining these variable frequencies by a periodic or aperiodic function and having a maximal phase difference between function curves provides the benefit that the light flashes can have a greater time interval as well as ensures that a very high ability to localize is achieved, thereby increasing warning effectiveness of the process and safety during operation of airplanes.

It is beneficial to automatically activate and deactivate the process by means of a radar system on an airplane in case of danger of collision, because in an uncomplicated and cost-effective manner, the process is switched on at the approach of another flying object, thereby effectively warning the approaching flying object, and is deactivated as soon as no other flying object is in a predetermined space around the airplane whereby safety during operation of the airplane can be substantially increased and the process is applied only when necessary, thereby preventing a habit-forming effect.

It is particularly beneficial that the process is engageable during take-off and landing phases, because in this manner the occurrence of bird impacts can be effectively prevented since birds react to light sources flashing at different intervals with variable frequencies by leaving the air space, whereby safety during operation of airplanes can be substantially increased also during take-off and landing phases by application of the process.

By providing the at least one control apparatus with a cyclical generator which determines a constant frequency and/or if the at least one control apparatus has a function generator or random generator or program memory, which determines a variable and/or a constant frequency, the benefit is derived that in a particularly uncomplicated and cost-effective manner each function suitable to generate flash sequences which provide a high warning effectiveness, a high ability to localize and, thereby, a high increase of safety during the operation of airplanes may be generated.

In this regard, it is beneficial that the function generator is a sine generator thereby creating a particularly uncomplicated and cost-effective device having also a very high warning effectiveness due to characteristics of the sine function, because the sine function ensures that, on the one hand, a constantly varying incline of the function is achieved and, on the other hand, that a high number of flash sequences have a time interval which is above the resolution limit for two light flashes in sequence.

Linking a light flash warning apparatus with a radar system on an airplane and automatically activating and deactivating it in case of danger of collision results in the benefit that the apparatus is automatically switched on when another flight object approaches the airplane within a predetermined distance, and is deactivated when no further flight object is present in a predetermined space around the airplane, thereby increasing safety during operation of the airplane and whereby also the apparatus is switched on only when necessary, thereby excluding a habit-forming effect as well as increasing service lives of the components.

It is beneficial that the light flash warning apparatus can be switched on during take-off and landing phases, because thereby the occurrence of bird impacts, in particular during the take-off and landing phases, is very efficiently avoided, since birds react to flash sequences generated by the apparatus by leaving the space around the airplane.

The embodiments of the invention in which an exclusive property or privilege are claimed are defined as follows:

1. A process for the avoidance of airplane collisions comprising the steps of:
    providing a light flash warning apparatus on an airplane of a type comprising at least first and second light sources;
    generating periodic light flashes having a substantially constant frequency from the first light source; and
    generating light flashes having a variable frequency from the second light source;
    wherein the step of generating light flashes having a variable frequency from the second light source includes the substep of controlling the variable frequency in accordance with a periodic or aperiodic function to lead and lag the phase of the
    wherein the function is a sine-like function or is a sinusoidal function.

2. A process for the avoidance of airplane collisions comprising the steps of:
    providing a light flash warning apparatus on an airplane of a type comprising at least first and second light sources;
    generating periodic light flashes having a substantially constant frequency from the first light source; and
    generating light flashes having a variable frequency from the second light source;
    wherein a function employed for controlling the variable frequency is defined such that a time interval between sequenced light flashes of the two light sources substantially always exceeds a limitation of resolution and wherein the function has a variable slope.

3. A process for the avoidance of airplane collisions comprising the steps of:
    providing a light flash warning apparatus on an airplane of a type comprising at least first and second light sources;
    generating periodic light flashes having a substantially constant frequency from the first light source; and
    generating light flashes having a variable frequency from the second light source;
    wherein a function employed for controlling the variable frequency generates flashes substantially only outside of a limit of resolution for sequenced light flashes from said first and second light sources.

4. A process as in claim 3 wherein the function is a random function.

5. An apparatus for the avoidance of airplane collisions comprising a light flash warning apparatus on an airplane having at least first and second light sources and generating light flashes in periodic intervals wherein the light flash warning apparatus comprises a control means ST for concurrently controlling the light flashes of said first and second light sources in a coordinated manner, wherein the at least one control means ST is linked to the first light source L1, via a first ignition device Z1, and is for controlling the first light source to emit light flashes having a substantially constant frequency and wherein the at least one control means ST is linked to the second light source L2, via a second ignition device Z2, and is for controlling the second light source to emit light flashes with a variable frequency which is coordinated relative to said constant frequency to lead or lag the phase of the constant frequency.

6. An apparatus as in claim 5 wherein the at least one control means ST comprises a cyclical generator which determines the constant frequency, and wherein the at least one control means comprises a function generator which determines the variable frequency.

7. An apparatus as in claim 5 wherein the at least one control means comprises a random generator which determines the variable frequency.

8. An apparatus as in claim 5 wherein the at least one control means comprises a program memory which determines the variable frequency.

9. A process for the avoidance of airplane collisions comprising the steps of: providing a light flash warning apparatus on an airplane of a type including at least first and second light sources; generating periodic light flashes having a variable frequency from the first light source; and generating light flashes having a variable frequency from the second light source with the variable frequency of the light flashes from the second light source being defined by a periodic function curve, providing a maximized phase difference between the variable frequencies of the light flashes from the first and second light sources.

* * * * *